United States Patent
Viola

(10) Patent No.: US 7,591,132 B2
(45) Date of Patent: Sep. 22, 2009

(54) APPARATUS AND METHOD TO INJECT A REDUCTANT INTO AN EXHAUST GAS FEEDSTREAM

(75) Inventor: Michael B. Viola, Macomb Township, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 284 days.

(21) Appl. No.: 11/533,425

(22) Filed: Sep. 20, 2006

(65) Prior Publication Data

US 2008/0066454 A1    Mar. 20, 2008

(51) Int. Cl.
*F01N 3/00* (2006.01)

(52) U.S. Cl. .............................. 60/286; 60/276; 60/295; 60/301; 60/303

(58) Field of Classification Search .................. 60/274, 60/276, 286, 289, 295, 297, 301, 303; 422/169, 422/172, 177, 182, 183
See application file for complete search history.

(56) References Cited

U.S. PATENT DOCUMENTS

| | | | | |
|---|---|---|---|---|
| 5,410,873 | A * | 5/1995 | Tashiro ........................ | 60/276 |
| 5,586,433 | A | 12/1996 | Boegner et al. | |
| 5,606,856 | A | 3/1997 | Linder et al. | |
| 5,727,385 | A | 3/1998 | Hepburn | |
| 6,021,639 | A * | 2/2000 | Abe et al. ...................... | 60/297 |
| 6,284,211 | B1 | 9/2001 | Miyadera et al. | |
| 6,293,097 | B1 * | 9/2001 | Wu et al. ....................... | 60/286 |
| 6,311,484 | B1 | 11/2001 | Roth et al. | |
| 6,327,851 | B1 * | 12/2001 | Bouchez et al. ............... | 60/286 |
| 6,446,430 | B1 * | 9/2002 | Roth et al. ..................... | 60/286 |
| 6,471,924 | B1 * | 10/2002 | Feeley et al. .............. | 423/213.5 |
| 6,735,940 | B2 * | 5/2004 | Stroia et al. ................... | 60/286 |
| 6,805,849 | B1 | 10/2004 | Andreasson et al. | |
| 6,895,747 | B2 * | 5/2005 | Upadhyay et al. ............. | 60/286 |
| 7,000,383 | B2 | 2/2006 | van Nieuwstadt et al. | |
| 7,063,642 | B1 * | 6/2006 | Hu et al. ..................... | 477/100 |
| 7,093,427 | B2 * | 8/2006 | van Nieuwstadt et al. ..... | 60/286 |
| 2004/0170548 | A1 | 9/2004 | Johnston Bartley et al. | |
| 2005/0002843 | A1 | 1/2005 | Kim et al. | |
| 2005/0091967 | A1 | 5/2005 | Sisken | |
| 2006/0029535 | A1 | 2/2006 | Ott | |
| 2006/0042234 | A1 * | 3/2006 | Song et al. .................... | 60/286 |
| 2006/0075742 | A1 | 4/2006 | Lee | |

OTHER PUBLICATIONS

Shelef, M.,Selective Catalytic Reduction of NOx with N-Free Reductants, Chem. Rev., 1995, pp. 209-225, vol. 95, American Chemical Society, USA.

Twigg, Martyn V., Automotive Exhaust Emissions Control, Platinum Metals Rev., 2003, 47,(4), pp. 157-162.

Kass, Michael D., et al., Selective Catalytic Reduction of Diesel Engine NOx Emissions using Ethanol as a Reductant, US DOE 9th DEER Conf., Newport, RI, Aug. 2003, pp. 1-9.

West, Brian, et al., In-Cylinder Production of Hydrogen during Net-Lean Diesel Operation, SAE Tech Paper, Apr. 2006, 2006-01-0212, SAE Warrendale, PA.

* cited by examiner

*Primary Examiner*—Tu M Nguyen

(57) ABSTRACT

An exhaust aftertreatment system for an internal combustion engine is provided including an apparatus and method to inject a reductant into the exhaust gas feedstream. Included is a fuel metering device adapted to inject reductant into the exhaust gas feedstream and a controllable pressure regulating device. A control module is operatively connected to the reductant metering device and the controllable pressure regulating device, and, adapted to effect flow of reductant into the exhaust gas feedstream over a controllable flow range.

6 Claims, 2 Drawing Sheets

APPARATUS AND METHOD TO INJECT A REDUCTANT INTO AN EXHAUST GAS FEEDSTREAM

GOVERNMENT CONTRACT RIGHTS

The U.S. Government has a paid-up license in this invention and the right in limited circumstances to require the patent owner to license others on reasonable terms as provided for by the terms of DE-FC26-02NT41218 awarded by the U.S. Department of Energy.

TECHNICAL FIELD

This invention pertains generally to exhaust aftertreatment systems for internal combustion engines, and an apparatus and method to inject a reductant upstream thereto.

BACKGROUND OF THE INVENTION

Manufacturers of internal combustion engines develop engine control strategies to satisfy customer demands and meet various regulations for emissions and fuel economy. One such engine control strategy comprises operating an engine at an air/fuel ratio that is lean of stoichiometry to improve fuel economy and reduce greenhouse gas emissions. Such operation is possible using compression-ignition (diesel) and lean-burn spark-ignition engines. When an engine operates with lean (excess oxygen) air/fuel ratio, the resultant combustion temperature is lower, leading to decreased engine-out $NO_x$ emissions; However, commercial application of lean-operating engines is limited due to lack of effective methods to remove $NO_x$ under a lean exhaust condition. Thus, efficient reduction of nitrogen oxides ($NO_x=NO+NO_2$) from diesel and lean-burn gasoline exhaust is important to meet future emission standards and improve vehicle fuel economy.

Reduction of $NO_x$ emissions from an exhaust feedstream containing excess oxygen is a challenge for vehicle manufacturers. By way of example, it is estimated that compliance with Bin 5 regulations in the United States may require an aftertreatment system capable of 70-90% $NO_x$ conversion efficiency on the FTP (Federal Test Procedure) cycle based on currently anticipated engine-out $NO_x$ levels. For practical application, the conversion efficiency must be obtained at a low temperature operating range (e.g., 200-350° C.) occurring during the aforementioned FTP cycle and at a higher temperature operating range (e.g., 450-550° C.) occurring during a high speed test cycle (e.g., US06 federal test procedure).

Several potential aftertreatment systems have been proposed for vehicle applications. One approach comprises using an aftertreatment system including injecting a $NO_x$ reductant, e.g., urea, upstream of a urea-SCR catalyst, to reduce $NO_x$ to $N_2$. Use of urea as a reductant necessitates a urea distribution infrastructure and an on-vehicle monitoring system for this secondary fluid, and may have potential problems in cold weather climates due to the relatively high freezing point (−12° C.) of the urea solution. $NO_x$ storage catalysts typically require large catalyst volumes, large amounts of platinum-group metals and low sulfur fuel for efficient storage operation. Such systems require periodic catalyst regeneration involving fuel injection to generate high exhaust gas temperatures and injection of reductants to regenerate the storage material of the catalyst.

There is a need for an effective apparatus and method to introduce a reductant into an exhaust gas feedstream over a broad range of operating conditions, for use on vehicles and other applications of internal combustion engines.

SUMMARY OF THE INVENTION

In accordance with an embodiment of the invention, there is provided an exhaust aftertreatment system for an internal combustion engine including an apparatus to inject a reductant into the exhaust gas feedstream. Included is a fluid metering device adapted to inject reductant into the exhaust gas feedstream and a controllable pressure regulating device. A control module is operatively connected to the reductant metering device and the controllable pressure regulating device, and, adapted to effect flow of reductant into the exhaust gas feedstream over a controllable flow range.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the embodiments of which are described in detail and illustrated in the accompanying drawing which forms a part hereof, and wherein.

DETAILED DESCRIPTION OF AN EMBODIMENT OF THE INVENTION

Figure 1:
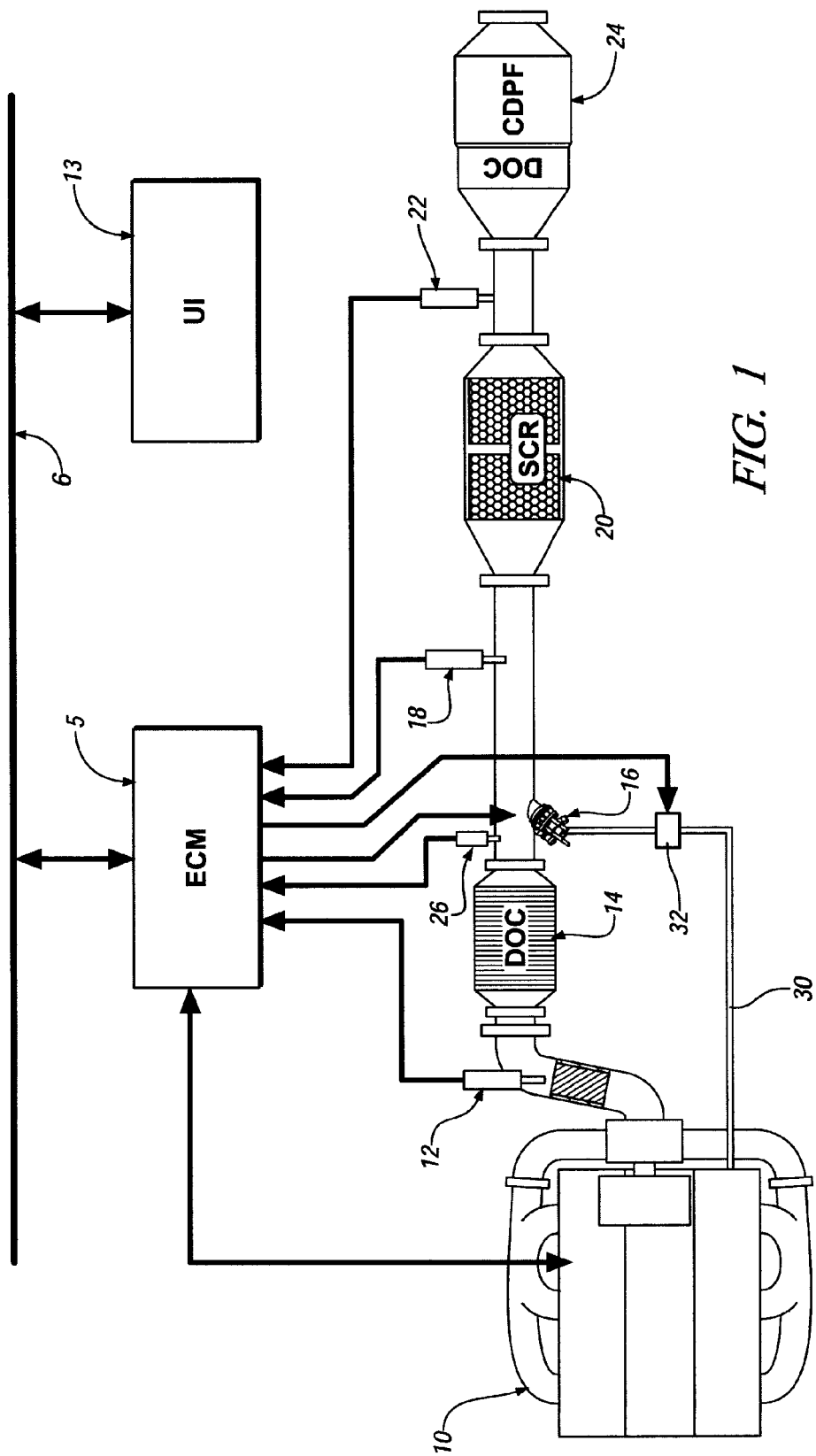
FIGS. 1 and 2 are schematic diagrams of a powertrain system, in accordance with the present invention.
Figure 2:
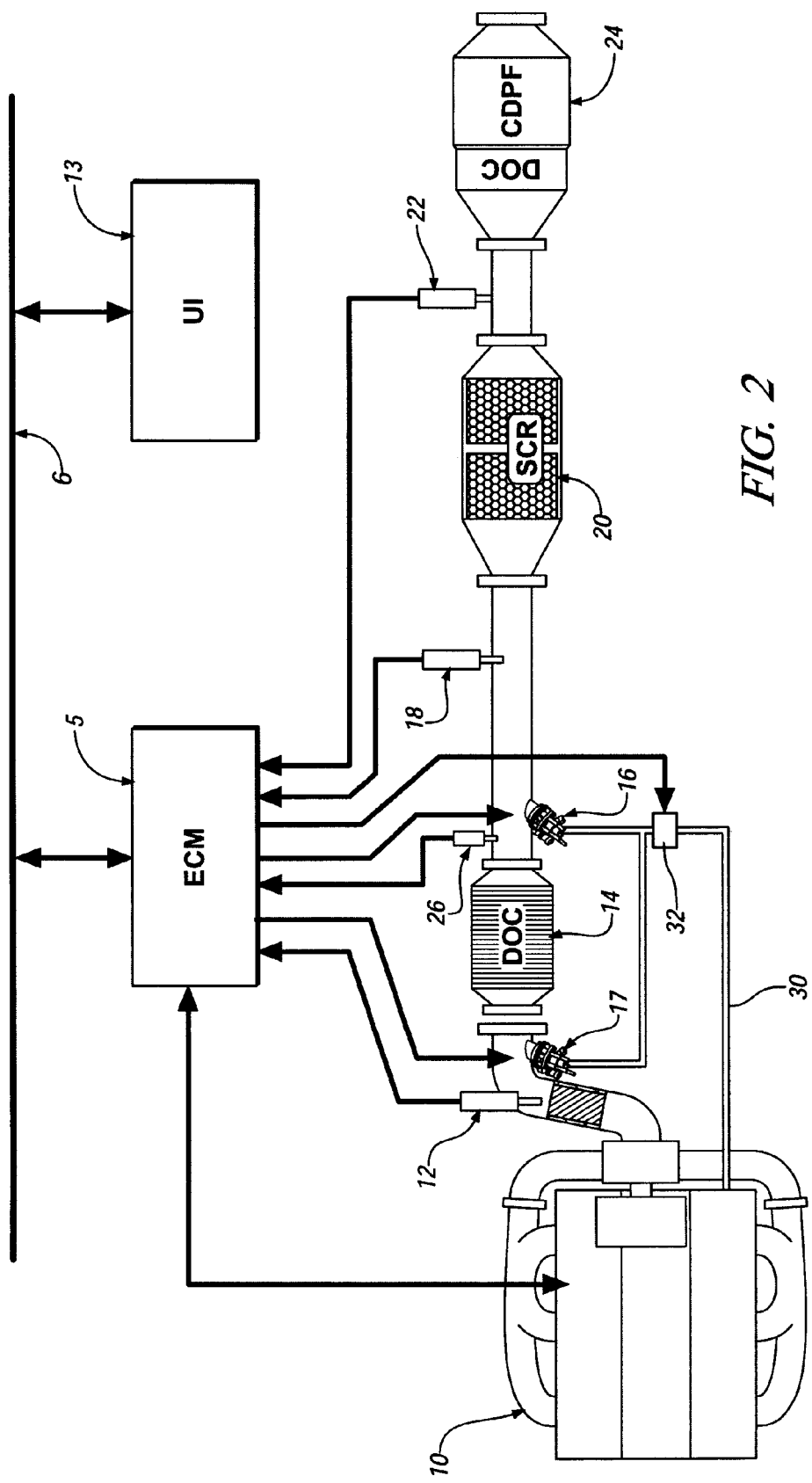

Referring now to the drawings, wherein the depictions are for the purpose of illustrating the invention only and not for the purpose of limiting the same, FIGS. 1 and 2 depict schematic diagrams of an internal combustion engine 10, exhaust aftertreatment system, and control system which has been constructed in accordance with embodiments of the present invention.

The exemplary engine and control system comprises a conventional four-cycle internal combustion engine 10 and electronic engine control module ('ECM') 5. The engine 10 comprises a known compression-ignition engine having an operating regime that is primarily lean of stoichiometry. Alternatively, the engine 10 may comprise an engine employing any one of a number of engine control strategies which operate lean of stoichiometry, e.g., homogeneous-charge compression-ignition engines, and lean-burn spark-ignition engines. The engine 10 includes a plurality of reciprocating pistons attached to a crankshaft, which is operably attached to a vehicle driveline to deliver tractive torque thereto. The engine 10 generates an exhaust gas feedstream comprising regulated constituent elements, typically including hydrocarbons ('HC'), carbon monoxide ('CO'), nitrides of oxygen ('$NO_x$'), and particulate matter ('PM'), among others. The regulated constituent elements are partially or completely converted to harmless gases in the exhaust aftertreatment system through such processes as oxidation and reduction.

The exhaust aftertreatment system comprises an integrated system acting to convert constituent elements of the exhaust gas feedstream to harmless gases. An exhaust manifold entrains and directs engine exhaust gases to the exhaust aftertreatment system. The illustrated aftertreatment system includes catalytic reactor devices comprising an oxidation catalyst ('DOC') 14, a hydrocarbon selective-catalyst-reduction ('SCR') catalyst 20, and a catalyst 24 comprising a second oxidation catalyst ('DOC') combined with a diesel particulate filter ('CDPF'). Each of the catalytic reactor devices comprises a device which employs technologies having various capabilities for processing the constituent elements of the exhaust gas feedstream, including oxidation, reduction, reductant dosing, and particulate filtering. The devices are preferably connected in series using known pipes and connectors. The arrangement and utilization of the specific catalytic reactor devices described with reference to FIGS. 1 and 2 are meant to be exemplary and not restricting to a specific design and layout.

The SCR device 20 comprises a catalytic device operative to selectively reduce a substantial portion of $NO_x$ gases in the exhaust to inert nitrogen gas in the presence of a hydrocarbon reductant. The exemplary SCR device 20 uses silver alumina ("AgAl") as catalytic material, and comprises a pre-selected weight percent of $Ag_2O$ supported on an alumina washcoat. An exemplary range of catalytic material is 2 to 4 wt. % AgAl, with a washcoat loading in a range 2 to 3 $g/in^3$ supported on a 400 cell per square inch cordierite monolith substrate. The HC-SCR device may, alternatively, utilize one of several known catalytic materials and washcoats having a range of loadings and supported on a substrate device. It is understood that the specifics of the catalyst are meant to be exemplary only, to demonstrate the system and control strategy described herein.

The aftertreatment system includes sensing devices and systems preferably signally connected to the ECM 5. The sensing devices preferably include a $NO_x$ sensor 12, a temperature sensor 26, and a second and exhaust gas sensing device 22. The $NO_x$ sensor 12 is operative to monitor exhaust gases exiting the engine 10. The temperature sensor is operative to monitor temperature of exhaust gases exiting the DOC 14 upstream of the SCR catalyst 20, or alternatively, the sensor can be placed in the bed of the SCR device 20, in either case to determine an operating temperature of the SCR device 20. The exhaust gas sensing device 22 is a second sensor operative to monitor constituent elements of exhaust gases after the SCR catalyst 20. The $NO_x$ sensor 12 preferably comprises a sensor operative to generate an electrical signal correlatable to a parametric value for $NO_x$ concentration in the exhaust gas feedstream, and further operative to generate a second electrical signal correlatable to a parametric value for air/fuel ratio of the exhaust gas feedstream, from which exhaust gas oxygen content can be determined. Alternatively the $NO_x$ sensor 12 may be a virtual $NO_x$ sensing device, comprising an algorithm resident in the control module operative to determine a parametric value for $NO_x$ based upon engine operating conditions. The exhaust gas sensing device 22 can comprise a $NO_x$ sensor operative to generate an electrical signal correlatable to a parametric value for $NO_x$ concentration in the exhaust gas feedstream after the SCR device 20. Alternatively, the exhaust gas sensing device 22 can comprise a hydrocarbon sensor operative to generate an electrical signal correlatable to a parametric value for HC concentration in the exhaust gas feedstream after the SCR device 20, for use in a feedback control scheme. Alternatively, the exhaust gas sensing device 22 can comprise an oxygen sensor operative to generate an electrical signal correlatable to a parametric value for $O_2$ concentration in the exhaust gas feedstream after the SCR device 20, for use in a feedback control scheme. Other sensors 18 may be deployed in the aftertreatment system upstream of the SCR device 20 as needed, e.g., an oxygen sensor for diagnostics and feedback control.

The control system preferably comprises a distributed control module architecture including ECM 5. The control modules of the control system are adapted to provide coordinated control of the various vehicle systems including the powertrain system described herein. The control system is operable to monitor inputs from sensing devices (e.g., sensors 12, 18, 22, 26) synthesize pertinent information, and execute algorithms to control various actuators (e.g., 16, 32) to achieve control targets, including such parameters as fuel economy, emissions, performance, driveability, and protection of hardware. The distributed control module architecture includes ECM 5, and User Interface ('UI') 13 which is operably connected to a plurality of other devices through which a vehicle operator typically controls or directs operation of the vehicle and powertrain. Exemplary devices through which a vehicle operator provides input to the UI 13 include an accelerator pedal, a brake pedal, transmission gear selector, and, vehicle speed cruise control. Each of the aforementioned controllers and devices communicate with other controllers, devices, sensors, and actuators via a high-speed local area network ('LAN') bus, depicted generally as item 6. The LAN bus 6 allows for structured communication of control parameters and commands between the various processors, control modules, and devices. The specific communication protocol utilized is application-specific. The LAN bus and appropriate protocols provide for robust messaging and multi-controller interfacing between the aforementioned controllers, and other controllers providing functionality such as antilock brakes, traction control, and vehicle stability.

The ECM 5 comprises a central processing unit signally electrically connected to volatile and non-volatile memory devices via data buses. The ECM 5 is operably attached to sensing devices and other output devices to ongoingly monitor and control operation of the engine 10 and exhaust system, as depicted. The output devices preferably include subsystems necessary for proper control and operation of the engine, including, by way of example, an air intake system, a fuel injection system, a spark-ignition system (when a spark-ignition engine is used), an exhaust gas recirculation system, and an evaporative control system. The engine sensing devices include devices operable to monitor engine operation and external conditions, and are typically signally attached to the ECM 5 via wiring harnesses.

Algorithms stored in the non-volatile memory devices are executed by the central processing unit and are operable to monitor inputs from the sensing devices and execute engine control and diagnostic routines to control operation of the engine and the exhaust aftertreatment devices using preset calibrations. Algorithms are typically executed during preset loop cycles, with each control algorithm executed at least once each loop cycle. Loop cycles are typically executed each 3.125, 6.25, 12.5, 25 and 100 milliseconds during engine operation. Alternatively, control algorithms may be executed in response to occurrence of an event. A cyclical event, e.g., calculation of engine fueling, may be executed each engine cycle. A diagnostic algorithm may be executed once per engine key-on cycle. A diagnostic algorithm may have further limitations including requirements for achieving specific enablement criteria before execution. One skilled in the art is able to generally understand use of the ECM 5 to control and diagnose operation of various aspects of the internal combustion engine 10.

Referring again to FIG. 1, the invention comprises an apparatus to inject hydrocarbon reductant into the exhaust gas feedstream of the exemplary internal combustion engine 10, upstream of one of the catalytic devices, (shown here as SCR device 20) preferably during lean operation of the internal combustion engine 5. The apparatus preferably comprises a reductant injection device 16 comprising a fluid or fuel metering device, e.g., a fuel injector, adapted to inject hydrocarbon reductant into the exhaust gas feedstream and fluidly connected to a controllable pressure regulating device 32. The ECM 5 is operatively connected to the reductant injection device 16 and the controllable pressure regulating device 32, and controls flow of reductant into the exhaust gas feedstream, over a controllable flow range. The hydrocarbon reductant preferably comprises hydrocarbon fuel. The exhaust system includes sensing devices, e.g., sensors 12, 18, 22, and 26, operative to monitor parameters of the exhaust gas feedstream from which the ECM 5 is able to determine parameters of exhaust gas temperature, flow rate and emissions. The ECM 5 includes algorithms comprising a feed forward control scheme and a feedback control scheme to control the fuel metering device and the pressure regulating device based upon a preferred ratio for $HC_1/NOx$ and the exhaust gas feedstream parameters, specifically $NO_x$ concentration. The internal combustion engine can comprise any one of a number of engines operative in lean air/fuel ratio region, including, e.g., a compression-ignition engine, and a homogeneous-charge compression-ignition engine. This is now described in detail.

The reductant injection device 16 of this embodiment comprises a common rail diesel fuel injector adapted for injecting diesel fuel into the exhaust gas feedstream. Adapting the diesel injector preferably comprises addition of fittings adapted for inserting the device into the exhaust system, and material alterations to accommodate the exhaust gas feedstream environment. A fuel line 30 from the engine provides pressurized fuel to the controllable pressure regulator device 32, the output of which is fluidly connected to the reductant injection device 16. The reductant injection device 16 and the controllable pressure regulator device 32 each are operatively connected to the ECM 5, which controls mass flow of reductant into the exhaust gas feedstream by controlling the controllable pressure regulator device 32 to control fuel pressure and controlling injector opening pulsewidth and rate of repetition to control mass of fuel flow out of the reductant injection device 16.

The use of the common rail diesel fuel injector for injecting fuel reductant requires a very high dynamic range, or turn-down ratio ('TDR'), defined as a ratio of maximum flow and minimum flow from the injector. Based on test data over a variety of test cycles in conjunction with expected engine-out $NO_x$ levels, a maximum flow rate of the reductant injection device 16 in a range of 1.0 g/sec is required to effectively reduce $NO_x$ under certain operating conditions, and a minimum flow rate in a range as low as 0.001 g/sec is required to effectively reduce $NO_x$ under certain operating conditions without corresponding HC slip, or breakthrough of HC emissions. Therefore, a reductant injection system having a TDR of 1,000:1 is anticipated, which exceeds the dynamic range of known, existing hydrocarbon fuel injection devices. Using the controllable pressure regulator 32 facilitates a broad range of flow rates from the reductant injection device 16, to achieve the prescribed maximum and minimum flows.

The controllable pressure regulating device 32 can comprise any one of a number of known devices operative to provide a quantity of pressurized fuel in the fuel line at a controlled pressure. An exemplary regulator comprises a differential pressure regulator which is designed to provide a controlled pressure, which is a sum of a signal or reference pressure and a bias pressure. The bias may be either positive or negative. By controlling the bias pressure, the controlled pressure can be varied.

A requisite mass flow of reductant is determined as follows. In operation, data sensed by the $NO_x$ sensor 12 in the exhaust stream is used to measure engine-out $NO_x$ emissions, typically in parts per million ('ppm'). The engine-out $NO_x$ and the exhaust gas temperature (measured by sensor 26) are used by the ECM 5 to determine exhaust temperatures, which are related to $NO_x$ reduction. The exhaust flow rate is calculated based upon mass air flow rates of air into the engine 10, and fuel and average exhaust gas properties. A catalyst space velocity is determined, based upon the catalyst volume and the flow rate. Space velocity represents a rate of feed of exhaust gas, in volume, per unit volume of the catalyst, and has a unit of inverse hour ($h^{-1}$).

The mass flow of injected reductant, e.g., diesel fuel, into the exhaust using reductant injection device 16 is calculated from determining a $HC_1:NO_x$ ratio required for peak $NO_x$ reduction and minimum HC slip past the HC-SCR catalyst 20. An exemplary strategy for determining a $HC_1:NO_x$ ratio required for peak $NO_x$ reduction and minimum HC slip past the HC-SCR catalyst is described in co-pending U.S. Patent Application Ser. No. 11/533,434 entitled METHOD AND APPARATUS TO SELECTIVELY REDUCE $NO_x$ IN AN EXHAUST GAS FEEDSTREAM, which in incorporated by reference. Using the diesel fuel properties one can calculate the carbon, on a $C_1$ basis, to the $NO_x$ ratio, $HC_1:NO_x$, needed for an entire operating range of the exemplary engine 10. A calibration, stored in tabular form in a memory device of ECM 5 comprises a plurality of optimized $HC_1:NO_x$ ratios, determined over a range of exhaust gas temperatures and a range of catalyst space velocity parameters. The optimized $HC_1:NO_x$ ratio for a given temperature and given SV is used by an algorithm in the ECM 5 in a feed forward control scheme to effect $NO_x$ reduction through the HC-SCR device 20. Furthermore, feedback from an oxygen sensor (not shown) in the exhaust feedstream after the injection device 16 and upstream of the SCR catalyst 20 can be used to adjust magnitude of the HC dosing. For example, low oxygen levels in the exhaust tend to lead to improved $NO_x$ efficiency. Therefore, as oxygen level in the exhaust gas feedstream drops, magnitude of HC injection can be reduced.

Mass of injected reductant is determined as follows. Magnitude of NOx emissions in the exhaust gas feedstream is determined by the ECM 5 using information from the sensors. The specific value of optimized $HC_1:NO_x$ ratio is determined from the aforementioned tabular calibration for the specific exhaust gas temperature and catalyst space velocity. The magnitude of $NO_x$ emissions is multiplied by the optimized $HC_1:NO_x$ ratio to determine the requisite amount of injected fuel, on a $C_1$ basis, to inject into the exhaust gas feedstream. By way of example, 1 ppm evaporated diesel fuel has approximately 14 carbon atoms; therefore, a $HC_1:NO_x$ ratio of 10 with 100 ppm inlet $NO_x$ in the exhaust feedstream requires injection of 10×100/14=71 ppm diesel fuel. Thus, the $HC_1/NO_x$ ratio is used to calculate and inject the correct fuel quantity for $NO_x$ reduction over the catalyst.

Referring now to FIG. 2, an alternative embodiment of the system is described. The second system includes all aspects of the first system described with reference to FIG. 1, and further includes a second reductant injection device 17 which is fluidly connected to the output of the controllable pressure regulator device 32. The second reductant injection device 17 is controlled by the ECM 5 and is operative to operative to inject a controlled quantity of hydrocarbon upstream of a second catalytic device, in this embodiment shown as the oxidation catalyst 14, to effect desulfation thereof. Alternatively (not shown), the second system can be mechanized to inject upstream of the catalyst 24, which includes the diesel particulate filter ('CDPF'), to effect regeneration thereof.

The system described hereinabove with reference to the embodiments is applicable to post-combustion injection schemes for various compression-ignition engines and for spark-ignition engines. As described, such systems include post-combustion HC injection for regenerating diesel particulate filters, post-combustion HC injection for desulfation of diesel oxidation catalysts, and, post-combustion HC injection for regeneration and desulfation of lean-$NO_x$ catalysts.

The exhaust aftertreatment system described herein comprises the catalytic reactor device 14, a plurality of exhaust gas sensing devices 12, 22, 26, and the reductant injection system. The reductant injection system dispenses reductant into the exhaust gas feedstream upstream of the catalytic reactor device 20, and comprises the reductant injection device 16 adapted to inject reductant into the exhaust gas feedstream and the controllable pressure regulating device 32. The control system determines parameters of the exhaust gas feedstream and a preferred reductant feed rate. The reductant injection system is controlled to the preferred reductant feed rate during lean operation. Use of such control permits optimization vehicle fuel economy while achieving maximum $NO_x$ reduction over the catalyst.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Apparatus, to inject a reductant into an exhaust gas feedstream of an internal combustion engine, comprising:
    a source of pressurized fuel;
    a controllable pressure regulator;
    a fuel injector;
    said controllable pressure regulator configured to receive said pressurized fuel and to provide a pressure regulated fuel to said fuel injector;
    said fuel injector configured to inject said pressure regulated fuel into the exhaust gas feedstream;
    a control module operatively connected to the controllable pressure regulator and the fuel injector, said control module configured to coordinate control of the controllable pressure regulator and the fuel injector to achieve an effective turndown ratio greater than a turndown ratio achievable through control of the fuel injector alone;
    wherein the fuel injector is configured to inject said pressure regulated fuel upstream of a selective catalyst reduction device;
    wherein the control module is further configured to coordinate control of both the controllable pressure regulator and the fuel injector based upon engine-out $NO_x$ concentration;
    wherein the control module is further configured to coordinate control of both the controllable pressure regulator and the fuel injector based upon a preferred ratio for $HC_1/NO_x$;
    further comprising the control module signally connected to a plurality of sensing devices configured to monitor parameters of the exhaust gas feedstream, and, configured to determine parameters of exhaust gas temperature, flow rate and emissions; and
    wherein the control module is further configured to coordinate control of both the controllable pressure regulator and the fuel injector using a feed forward control scheme based upon the preferred ratio for $HC_1/NO_x$ and the exhaust gas feedstream parameters.

2. The apparatus of claim 1, wherein the control module is further configured to coordinate control of both the controllable pressure regulator and the fuel injector using a feedback control scheme based upon the preferred ratio for $HC_1/NO_x$ and the exhaust gas feedstream parameters.

3. The apparatus of claim 1, wherein said source of pressurized fuel, said controllable pressure regulator, said fuel injector and said control module are cooperatively configured to effect injection of said pressure regulated fuel over a range of at least approximately 0.001 gram/second to approximately 1.0 gram/second.

4. The apparatus of claim 1, wherein the internal combustion engine comprises a compression-ignition engine.

5. The apparatus of claim 1, wherein the internal combustion engine comprises a homogeneous-charge compression-ignition engine.

6. The apparatus of claim 1, wherein the effective turndown ratio is at least about 1000:1.

* * * * *